(12) United States Patent
Fel (10) Patent No.: US 10,960,905 B2
(45) Date of Patent: Mar. 30, 2021

(54) PERSONAL PROTECTION DEVICE FOR FIXING ON THE UNDERSIDE OF A RAIL VEHICLE

(71) Applicant: Bombardier Transportation GmbH, Berlin (DE)

(72) Inventor: Landri Fel, Vienna (AT)

(73) Assignee: Bombardier Transportation GmbH, Berlin (DE)

( * ) Notice: Subject to any disclaimer, the term of this patent is extended or adjusted under 35 U.S.C. 154(b) by 108 days.

(21) Appl. No.: 16/700,429

(22) Filed: Dec. 2, 2019

(65) Prior Publication Data
US 2020/0198669 A1 Jun. 25, 2020

(30) Foreign Application Priority Data
Dec. 20, 2018 (DE) .......... 10 2018 133 181

(51) Int. Cl.
*B61F 19/04* (2006.01)
*B60R 19/20* (2006.01)
*B60R 21/36* (2011.01)
*B60R 21/00* (2006.01)

(52) U.S. Cl.
CPC ............ *B61F 19/04* (2013.01); *B60R 19/205* (2013.01); *B60R 21/36* (2013.01); *B60R 2021/009* (2013.01)

(58) Field of Classification Search
CPC .......... B61F 19/00; B61F 19/04; B61F 19/06; B61F 19/08; B60R 19/205; B60R 21/36; B60R 2021/009; B61G 11/00
See application file for complete search history.

(56) References Cited

U.S. PATENT DOCUMENTS

| | | | | |
|---|---|---|---|---|
| 6,474,489 B2 * | 11/2002 | Payne | ..................... | B61F 19/06 105/392.5 |
| 6,619,491 B2 * | 9/2003 | Payne | ..................... | B61F 19/06 105/392.5 |
| 6,814,246 B2 * | 11/2004 | Payne | ..................... | B61F 19/06 105/392.5 |

(Continued)

FOREIGN PATENT DOCUMENTS

| | | |
|---|---|---|
| DE | 121019 | 4/1900 |
| DE | 148622 | 9/1902 |

(Continued)

*Primary Examiner* — Zachary L Kuhfuss
(74) *Attorney, Agent, or Firm* — The Webb Law Firm (57) ABSTRACT

An airbag module and a rail vehicle with an airbag module are described herein. The airbag module includes a support flap with a front end and a rear end. The rear end of the support flap is thereby pivotably mounted by means of a first pivot bearing, wherein the airbag module is convertible from a closed state into an open state by pivoting the support flap and the front end of the support flap thereby moves toward the track. The airbag module includes an airbag fixed on the airbag module. The airbag is folded in the closed state of the airbag module, and is unfolded in the open state of the airbag module. In its unfolded state, the airbag projects beyond the front end of the support flap, so that the unfolded airbag and the support flap together form an impact protection for a person on the track. Furthermore, a rail vehicle with one or a plurality of airbag modules is described.

17 Claims, 9 Drawing Sheets

(56) References Cited

U.S. PATENT DOCUMENTS

| | | | |
|---|---|---|---|
| 8,646,391 B2* | 2/2014 | Schmidt | B61D 17/02 105/8.1 |
| 2020/0198668 A1* | 6/2020 | Fel | B61F 19/08 |
| 2020/0198669 A1* | 6/2020 | Fel | B61F 19/08 |

FOREIGN PATENT DOCUMENTS

| | | | | |
|---|---|---|---|---|
| DE | 166218 | | 2/1904 | |
| DE | 255173 | | 6/1912 | |
| DE | 2910481 | A1 | 9/1979 | |
| DE | 102012007814 | A1 | 11/2012 | |
| DE | 102011114298 | A1 * | 3/2013 | B60R 21/36 |
| DE | 102013204555 | A1 * | 10/2014 | B61F 19/04 |
| DE | 102013211273 | A1 | 12/2014 | |
| DE | 102017001332 | A1 | 7/2017 | |
| EP | 2995508 | A1 | 3/2016 | |
| EP | 2995508 | B1 * | 10/2017 | B61F 19/08 |
| GB | 190207793 | A | 5/1903 | |
| JP | 2003341513 | A | 12/2003 | |
| JP | 2006273139 | A | 1/2016 | |
| JP | 2016007951 | A | 1/2016 | |
| KR | 1020070059472 | A | 6/2007 | |
| KR | 1020110071693 | A | 6/2011 | |
| WO | WO-2014122212 | A1 * | 8/2014 | B61F 19/00 |
| WO | 2014140074 | A1 | 9/2014 | |
| WO | 2018019540 | A1 | 2/2018 | |

\* cited by examiner

PERSONAL PROTECTION DEVICE FOR FIXING ON THE UNDERSIDE OF A RAIL VEHICLE

CROSS-REFERENCE TO RELATED APPLICATION

This application claims priority to German Patent Application No. 10 2018 133 181.9 filed Dec. 20, 2018, the disclosure of which is hereby incorporated by reference in its entirety.

BACKGROUND OF THE INVENTION

Field of the Invention

The invention relates to a modular personal protection device for fixing on the underside of a rail vehicle.

Description of the Related Art

Accidents, in which rail vehicles collide with persons (passers-by), usually end fatally for the person. In many cases, the passer-by ends up under the rail vehicle after the collision, where they suffer serious injuries, as the vehicle underside of a rail vehicle often represents a high risk of injury due to sharp and unprotected edges. Airbags are principally known as protective measures due to multiple uses in the automobile industry; however, they have rarely been used up to now in the rail vehicle industry, even though multiple published documents exist regarding the application of personal protection measures using airbags in use for rail vehicles.

Most ideas draw on two principles. On the one hand, protecting persons who have been partially or not yet run over from additional collisions with structures under the vehicle using protective devices, and/or on the other hand, preventing a person who has been run over from moving farther into the structures located toward the rear in the direction of travel, in particular, the wheels of the train.

Thus, documents DE 148622 C, DE 166218 C, DE 255173 C, EP 2 995 508 A1 and WO 2018/019540 A1 are known, which disclose soft structures that open or stretch out, for example, nets, planes, or airbags, on the vehicle front. These soft structures are designed to prevent the running over of passers-by in the direct area of the vehicle front, i.e., the effective protective area is the area at the vehicle front of the rail vehicle. The soft structures are thereby guided by a more robust structure.

On the other hand, documents GB 1902 07793 A, DE 121019 C and WO 2014/140074 A1 are known, which disclose devices that are unfoldable or extendable from below. This are arranged underneath the vehicle bottom and behind the vehicle front respectively, so that the devices prevent the person who has been run over from arriving or reaching structures located farther back.

DE 148622 C thus describes a protective device on tram cars. The protective device has a catch net as a protective mechanism, which is guided in a more robust structure, wherein the catch net may be unfolded upon impact of the tram car. The protective device is thereby arranged in front of the tram car.

A tram protective device is known from DE 166218 C, which is triggered by an obstacle and then springs forward in order to be able to pick up the obstacle by means of a catch device.

DE 255173 C describes a protective device for tram cars, which has containers, filled with compressed air under the platform and moveable about articulations, which are respectively connected to an elastic sack (protective cushion). Upon the impact of an obstacle against the elastic sacks, the affected container is moved backwards, by which means the compressed air flows into the respective elastic sack.

A vehicle is known from EP 2 995 508 A1 whose front section has a protective device. The protective device comprises a bumper arranged on the front side of the vehicle, wherein, in the case of an impact or the presence of an obstacle, a flap of the bumper opens toward the under part of the vehicle, wherein the flap has a protective surface. Furthermore, the protective device has a cover arranged on the front side of the vehicle, which may transfer from a closed into an open position, wherein the cover has first means for absorbing impact energy which are capable of unfolding due to inflation.

A personal protection device for a vehicle with a front fairing arranged in front of elements causing risk of injury is described in WO 2018/019540 A1. The front fairing has a two-part frame and a flexible tarpaulin, wherein a lower frame part is articulately connected to an upper frame part.

GB 1902 07793 A shows a cradle, arranged below a rail vehicle, with a trigger mechanism mounted upstream, which can accommodate a person who has been run over.

DE 121019 C describes a protective device, arranged on the underside of a tram car, and having a protective wall, which extends across the width of the track and which, after triggering, falls on the track and thereby lifts the front end of the rail vehicle.

A safety device is known from WO 2014/140074 A1 for protecting persons, which is arranged underneath the vehicle frame and has two functional elements. The second functional element is fixed on the first functional element and corresponds to a braking device, which may have an airbag. The first functional element corresponds to a deflector device, with which it may be prevented that a person, already partially run over, moves farther under the vehicle in the direction of the wheels.

Protective devices arranged in front of the rail vehicle and having an airbag have the disadvantage that the vehicle front is very hard. Thus, a "trampoline" effect may occur, in which a person bounces off, even in a somewhat muted way, and may thus suffer additional injuries.

Airbags underneath the rail vehicle may tear if they contact the track over a longer time period. For example, the time period between initiating a braking process of the rail vehicle and a stopping of the rail vehicle may already be sufficient for seriously damaging an airbag.

SUMMARY OF THE INVENTION

It is therefore the object of the present invention to provide a protective device, in particular an airbag module for a rail vehicle and a rail vehicle which enables improved safety for persons.

According to one embodiment, an airbag module is provided for fixing on the underside of a rail vehicle, between the rail vehicle and the track. The airbag module comprises a bracket for fixing the airbag module on the underside of the rail vehicle. The airbag module further comprises a support flap with a front end and a rear end. The rear end of the support flap is pivotably mounted by means of a first pivot bearing, wherein, by pivoting the support flap, the airbag module is convertible from a closed state into an open state and the front end of the support flap thereby moves toward the track. The airbag module furthermore comprises a guide element with a front end and a rear end. The front end of the guide element is pivotably mounted by means of a second pivot bearing, and in the open state of the airbag module, the rear end of the guide element is pivoted in the direction of the track. The airbag module comprises a third pivot bearing, which moveably connects the support flap and the guide element to each other. The airbag module comprises an airbag fixed on the airbag module, in particular on the support flap and/or on the bracket. In the closed state of the airbag module, the airbag is folded, and it is unfolded in the open state of the airbag module. In its unfolded state, the airbag projects beyond the front end of the support flap, so that the unfolded airbag and the support flap together form an impact protection for a person on the track. A pivot bearing, selected from the group consisting of the first pivot bearing, the second pivot bearing, and the third pivot bearing, is a displaceable pivot bearing.

The track includes the entire ground underneath the rail vehicle, thus both the rails and also the substrate next to and between the rails.

The airbag is unfolded in the open state of the airbag module, and is thereby preferably filled with gas, by which means the airbag functions as an impact protection for a person on the track. In case the airbag module is in the open state, however, the airbag is not filled, but instead is partially or completely flaccid, for example due to damage caused by a sharp object on the track, the cover of the airbag additionally functions as a safety protection for a person, i.e., the airbag acts as a catch net. This is facilitated in that the airbag is fixed at a plurality of positions, in particular at the support flap and the bracket. After the collision with a person, the airbag may thus not move farther backward and "slip out" of the collision area with the person. The airbag, which is preferably fixed at a plurality of positions, spans the opening of the airbag module that faces forward. This opening is formed between the bracket and the support flap pivoted downward toward the track. The collision area, i.e., the area in which a person, who has been run over, is safely held by the airbag module, therefore remains in front of or in the area of the airbag module, and therefore in front of areas lying farther behind in the direction of travel.

The support flap, held at its rear end by means of the first pivot bearing, is pivoted downward toward the track in the direction of travel in the open state of the airbag module and therefore is inclined upward toward the rear. The guide element, held at its front end by means of the second pivot bearing, is pivoted downward toward the track in the open state of the airbag module and therefore is inclined upward toward the front. The support flap and the guide element are movably connected to each other via the third pivot bearing, for example, the third pivot bearing may be arranged in each case approximately in the center of the support flap and the guide element. The geometric structure made from the guide element and the support flap in the open state of the airbag module appears, when viewed from the side, approximately like the letter "X" or the arms of a scissor. The third pivot bearing may have the effect that the movements of the guide element and the support flap are mechanically coupled. In particular, the guide element is configured to guide the movement of the support flap.

One of the three pivot bearings is formed as a displaceable pivot bearing in order to facilitate a conversion between the closed state and the open state, i.e., in order to facilitate the pivoting of the guide element and the support flap in the direction of the track.

According to one embodiment, the support flap is pivotably mounted at its rear end on the bracket by means of the first pivot bearing. The bracket is therefore connected to the rear end of the support flap via the first pivot bearing. Thus, a compact design of the airbag module is facilitated.

According to one embodiment, the guide element is pivotably mounted on its front end on the bracket by means of the second pivot bearing. The bracket is therefore connected to the front end of the guide element via the second pivot bearing. Thus, a compact design of the airbag module is facilitated.

The support flap therefore forms a support surface for the airbag, which lies behind the airbag in the direction of travel. The support flap is in turn guided and supported by the guide element. The airbag is therefore prevented from slipping away "to the rear" by the support flap and the guide element and may, in particular in the gas-filled state, catch a person and, in conjunction with the support flap, then prevent the person from moving farther under the traveling rail vehicle. In particular, when the airbag module is arranged in front of the front wheels in the direction of travel, the contact between a person and the wheels may be safely prevented.

In one embodiment, the airbag is fixed on the bracket and on the support flap in such a way that the attachments lie as far back as possible relative to the front end of the gas-filled end of the airbag, and thus are removed from a possible collision zone with a person.

According to one embodiment, an attachment of the airbag is carried out at the support flap and at the bracket, and thus a support of the airbag toward a rear end of the airbag module is provided, for example, along a direction of travel of the rail vehicle. In the open state of the airbag module, wherein the airbag is unfolded, a "slipping through", moving past, or moving farther toward structures located farther back is prevented for a person, who has been run over, by this means. In the case that the airbag module is in the open state, yet the airbag is not filled, but instead is partially or completely flaccid, a "slipping through", moving past, or moving farther toward structures located farther back is prevented for a person, who has been run over.

In one embodiment, the airbag is fixed on the bracket by means of at least one attachment and on the support flap by means of at least one second attachment.

Since the airbag offers protection to a person in the open state of the airbag module, both if the unfolded airbag is filled with gas and also if the unfolded airbag is partially filled or completely flaccid, the airbag module offers protection to a person, not only at the time of the collision, but also over a significantly longer time period, for example, until the rail vehicle has come to a halt.

According to one embodiment, the airbag module may contact the track in the open state. In the open state of the airbag module, the rear end of the guide element is hereby located vertically lower than the front end of the support flap. In particular, the support flap thereby does not contact the track. The vertical distance between the track and the front end of the support flap may thereby usually be between 30 mm and 150 mm. A vertical distance in this range advantageously facilitates that the airbag may sufficiently unfold, which may not be provided at a significantly greater vertical distance between the track and the support flap. Furthermore, almost the entire space between the vehicle underside and the track is made use of in spreading out the airbag and catching a person involved in an accident, wherein there is no risk of a person slipping through at this type of vertical distance. Furthermore, a vertical distance between 30 mm and 150 mm is sufficient so that the support flap does not "get stuck" on an obstacle or that damage occurs in any way to the support flap.

According to one embodiment, the guide element may directly or indirectly contact the track in the open state of the airbag module. Due to the mechanical coupling between the support flap and the guide element by means of the third pivot bearing, the vertical distance between the track and the front end of the support flap is determined by the guide element, in particular by an opening angle β between the bracket and the guide element. The guide element holds the front end of the support flap at a distance from the track, by which means damage to the support flap is prevented, for example.

According to one embodiment, the guide element may include a rounded section or a beveled section at the rear end. The rounded section or the beveled section may have elastic properties, primarily in the vertical direction. The rear end of the guide element, in particular the rounded section or the beveled section, functions to guide the support flap and the airbag over obstacles on the track in the presence of said respective obstacles. The front end of the support flap is thereby lifted in the direction of the bracket, i.e., in the vertical direction. An impact of the stable and rather rigid support flap on the obstacle, and thus potential damage, may thus be prevented. The opening angle α between the bracket and the support flap is thus reduced somewhat. The shape of the rounded section and the beveled section has the effect that the rear end of the guide element may easily slide over the obstacle, wherein an elastic configuration of the rounded section or the beveled section promotes this sliding even more.

The airbag module is suitable for different distances between the underside of the rail vehicle and the track, as the support flap and the guide element are pivotably mounted. The airbag module is advantageously suited in the open state of adapting itself to differing distances between the underside of the rail vehicle and the track, for example, during travel. The guide element hereby contacts the track, wherein, for example at an elevation of the track, the guide element is moved vertically upward, and/or the opening angle β between the guide element and the bracket is reduced, by which means the support flap, mechanically connected to the guide element, is likewise moved upward, and/or the opening angle α between the support flap and the bracket is reduced. The airbag module is thus configured to, at a change in the spacing between the underside of the rail vehicle and the track, adapt the opening angle β between the guide element and the bracket, and as a consequence of this the opening angle α between the bracket and the support flap. In other words, the airbag module is configured to adapt a height of the airbag module in the open state. The height of the airbag module is defined as the extension of the airbag module perpendicular to an upper side of the bracket, wherein the upper side of the airbag module functions for fixing to the rail vehicle. As the airbag module may adapt to changing distances between the underside of the rail vehicle and the track, a variability with respect to a composition of the track and/or the substrate is achieved, wherein the airbag module is particularly suited for tracks with closed spaces between the rails, and also for the presence of railway sleepers, where the substrate between the rails may be lower than a rail upper edge.

In one embodiment, the airbag module may be suitable for obstacles with a vertical height of up to 50 mm, i.e. obstacles projecting up to 50 mm above the track. In another embodiment, the airbag module may be suitable for obstacles with a verticle height of more than 50 mm, for example, up to 120 mm. The support flap preferably does not contact the obstacle, so that no force transmission is carried out from the obstacles to the support flap, so that the risk of damage, in particular deformation of the support flap, is reduced. Substrates and small irregularities correspond to the usual conditions, in particular in most cities, in particular if the rails are embedded in the ground, wherein the track is often covered with grass tiles or concrete plates or asphalted surfaces. In this case, obstacles typically occur with a vertical height of 10 to 40 mm. The airbag module according to the present disclosure is thus suitable for sliding over typical obstacles.

According to one embodiment, the support flap is essentially parallel to the bracket in the closed state of the airbag module and/or the support flap has an angle (opening angle) α from 30° to 80° with the bracket.

The distance between the third pivot bearing and the first pivot bearing may be greater than the distance between the third pivot bearing and the second pivot bearing. By this means, in the open state of the airbag module, an opening angle β between the guide element and the bracket is greater than an opening angle α between the bracket and the support flap.

According to another embodiment, the airbag module has a height of at most 80 mm in its closed state. Due to the small dimension and a small mass of the airbag module, the expense for the attachment to the underside of the rail vehicle is significantly reduced with respect to the protective devices known from the prior art. A length and a width of the airbag module may be flexibly determined based on the technical properties of the rail vehicle or the composition of the track. The length of the airbag module is the extension from a front end of the airbag module to the rear end of the airbag module, while the width of the airbag module is the extension of the airbag module perpendicular to the height and to the length.

According to one embodiment, the bracket includes a storage unit, open toward the support flap, which is closed by the support flap in the closed state of the airbag module. The storage unit, together with the support flap, forms a receptacle into which the airbag is inserted. The receptacle functions for protecting the folded airbag from environmental factors in the closed state of the airbag module.

The support flap may include a frame, with the first pivot bearing arranged at the rear end thereof, and a cover plate. The frame provides sufficient stability to the support flap, whereas the cover plate as a flat object functions on the one hand as a support surface for the airbag in the open state of the airbag module and on the other hand as a closure cover for the storage unit in the closed state of the airbag module. The cover plate protects the folded airbag from environmental factors in the closed state of the airbag module and supports the airbag after it is unfolded.

According to one embodiment, the second pivot bearing is the displaceable pivot bearing. In another embodiment, the first pivot bearing is the displaceable pivot bearing. In the case the first pivot bearing is the displaceable pivot bearing or the second pivot bearing is the displaceable pivot bearing, the bracket may include a guide rail for displacing the first or the second pivot bearing. The first pivot bearing or the second pivot bearing may be fixed on a roller or a sliding pad, wherein a displacement of the pivot bearing is facilitated. The roller or the sliding pad may thereby be arranged within the guide rail.

According to another embodiment, the third pivot bearing is the displaceable pivot bearing. In this case, either the support flap or the guide element may include a guide rail for displacing the third pivot bearing. The third pivot bearing may be fixed on a roller or a sliding pad, by which means a displacement of the pivot bearing is facilitated. The roller or the sliding pad may thereby be arranged within the guide rail.

In one embodiment, the airbag module includes a gas pressure device for sudden filling of the airbag during opening of the airbag module. The gas pressure device may be connected to the bracket and fixed on the same.

In one embodiment, the support flap is fixed in the area of its front end via a releasable locking means in the closed state of the airbag module. The locking means is releasable for releasing the support flap and for converting the airbag module into the open state. By releasing the support flap, the guide element may likewise be released. According to one embodiment, the locking means may be configured to trigger the sudden filling of the airbag by the gas pressure device. In particular, the releasable locking means may be configured to release the support flap within at most 20 ms.

In another embodiment, the guide element is fixed in the area of its rear end via a releasable locking means in the closed state of the airbag module. The locking means is releasable for releasing the guide element and for converting the airbag module into the open state. By releasing the guide element, the support flap may likewise be released. According to one embodiment, the locking means may be configured to trigger the sudden filling of the airbag by the gas pressure device. In particular, the releasable locking means may be configured to release the support flap within at most 20 ms.

When the support flap and/or the guide element has been released by the locking means, the airbag module may be converted into the open state due to the dead weight of the support flap and the guide element. The airbag module may additionally include a spring device. The spring device may be tensioned in the closed state of the airbag module, and after its release, the support flap and the guide element pivot suddenly to open the airbag module. Due to the presence of the spring device, the time duration required to convert from the closed state into the open state may advantageously be substantially reduced.

The airbag module is suitable for installing or attaching on a plurality of different rail vehicles. In particular, the airbag module is suitable for retroactive installation or attachment on a plurality of already-existing rail vehicles, even in the case of very different rail vehicle geometry.

The support flap may thus satisfy a plurality of functions, in particular: a) the support flap may function as protection for the folded airbag in the closed state of the airbag module; b) the support flap functions for fixing the airbag; c) in the open state, the support flap functions to support the airbag in the direction of the rear end of the airbag module. The support flap corresponds to a "support structure" in functions a) and b) and functions as a "retaining device" in function c).

According to one embodiment, a rail vehicle is provided including an airbag module according to any of the preceding embodiments, wherein the airbag module is fixed on the underside of the rail vehicle between the rail vehicle and the track.

According to one embodiment, the airbag module is fixed on the rail vehicle such that in the closed position, the airbag module does not project past the front end and/or the sides of the rail vehicle. For example, in the closed position, the airbag module does not project past the front end nor past the sides of the rail vehicle. By this means, a risk of injury to persons (passers-by) at the airbag module is reduced, in particular in the case where a collision occurs between a person and the rail vehicle.

The rail vehicle may include a plurality of airbag modules. Advantageously, each airbag module may be fixed individually and independently from other airbag modules on the rail vehicle. In particular, the airbag modules do not require any mutual structures, for example, a mutual bracket or support structure. By this means, the workload is significantly reduced in the case of maintenance and/or an installation, conversion, or removal of the airbag module, in particular with respect to rail vehicles, which include a plurality of safety devices that comprise a mutual bracket or support structure.

As the airbag module may be realized as an independent module, a large variability exists with respect to the number of airbag modules desired for the rail vehicle. The airbag module according to the present disclosure facilitates the free selection of the number of airbag modules based on the technical properties, in particular the vehicle width.

In one embodiment, the rail vehicle includes at least two of the airbag modules described herein. The rail vehicle defines a direction of travel. When viewed in the direction of travel, the two airbag modules are laterally adjacent and, with respect to a center line of the rail vehicle, arranged on different sides of the rail vehicle. This embodiment may be advantageous, in particular if the rails of the track do not project above the substrate, for example, if the rails are embedded in the substrate, or in the presence of closed spaces between rails.

In another embodiment, the rail vehicle includes at least three of the airbag modules described herein. A first airbag module is fixed on the rail vehicle in such a way that it is located between the rails, when viewed in the direction of travel. A second airbag module is fixed on the rail vehicle in such a way that it is located on the left side of the left rail, when viewed in the direction of travel. Furthermore, a third airbag module is fixed on the rail vehicle in such a way that it is located on the right side of the right rail, when viewed in the direction of travel. This embodiment is particularly advantageous in the presence of railway sleepers, where the substrate next to a rail may be lower than a rail upper edge. As the three airbag modules are located between or lateral to the rails, the three airbag modules may each contact the track, in particular, the airbag modules may contact the substrate, by which means a "slipping through", moving past, or moving farther toward structures located farther back is prevented for a person, who has been run over.

In another embodiment, the rail vehicle includes at least four of the airbag modules described herein. A first airbag module and a second airbag module are fixed on the rail vehicle in such a way that they are located between the rails, when viewed in the direction of travel. A third airbag module is fixed on the rail vehicle in such a way that it is located on the left side of the left rail, when viewed in the direction of travel. Furthermore, a fourth airbag module is fixed on the rail vehicle in such a way that it is located on the right side of the right rail, when viewed in the direction of travel. This embodiment is particularly advantageous in the presence of railway sleepers, where the substrate next to a rail may be lower than a rail upper edge. As the four airbag modules are located between or lateral to the rails, the four airbag modules may each contact the track, in particular, the airbag modules may contact the substrate, by which means a "slipping through", moving past, or moving farther toward structures located farther back is prevented for a person, who has been run over.

In addition to the number of airbag modules fixed on the rail vehicle, the respective position of the airbag module on the underside of the rail vehicle is also freely selectable. In particular, at least one of the airbag modules may be fixed offset to another airbag module, when viewed in the direction of travel. For example, in case of the presence of a coupling element arranged in the area of the front side of the rail vehicle, it may be advantageous to fix an airbag module, located for example, between the rails, offset toward the rear on the rail vehicle. Thus, the positions of the airbag modules may be variably adapted to the composition of the track and to the technical properties of the rail vehicle.

In addition to the number of airbag modules fixed on the rail vehicle and the respective position of the airbag module on the underside of the rail vehicle, the orientation of the airbag module with respect to the underside of the rail vehicle is also freely selectable. In particular, at least one of the airbag modules may be non-parallel to one of the other airbag modules. For example, it may be advantageous that an airbag module arranged next to a rail has a different orientation with respect to the underside of the rail vehicle than an airbag module located between the rails.

In summary, on the one hand, the length of the airbag module and/or the width of the airbag module may be freely selected; on the other hand, the number of airbag modules, and/or the orientation of the airbag module with respect to the underside of the rail vehicle, and/or the position of the airbag module at the underside of the rail vehicle may be freely determined. Due to the modularity of the solution according to the present disclosure, the potential for a non-rectilinear arrangement of the airbag modules on the underside of the rail vehicle is facilitated. A plurality of airbag modules may be arranged on the underside of the rail vehicle along a convex or concave curve, by means of which dangerous areas of the rail vehicle may be covered, and the front ends of the airbag modules may be arranged in preferred, freely predetermined areas.

According to one embodiment, the rail vehicle includes an obstacle position detection system, which is configured to detect an obstacle and to detect a position of the obstacle. The rail vehicle according to the present disclosure may, in the case that a plurality of airbag modules are present, be configured to selectively convert one or more of the airbag modules into the open state based on the position of the obstacle communicated by the obstacle position detection system. The obstacle position detection system, in conjunction with a selective triggering of the airbag modules, may advantageously reduce the expense for repairs and/or replacements, as potentially not all of the airbag modules fixed on the rail vehicle are converted into the open state. The airbag modules not converted into the open state remain functional and do not have to be repaired and/or replaced.

BRIEF DESCRIPTION OF THE DRAWINGS

The invention will subsequently be described in greater detail by way of embodiments, without these limiting the scope of protection defined by the claims.

The appended drawings illustrate embodiments and function together with the description to explain the principles of the invention. The elements of the drawings are relative to each other and not necessarily to scale. Identical references numerals correspondingly relate to similar parts.

DETAILED DESCRIPTION OF THE INVENTION

Figure 1:
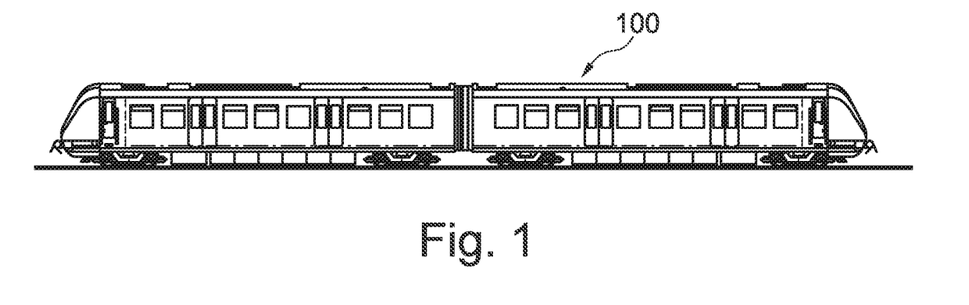
FIG. 1 shows a side view of a rail vehicle according to one embodiment.

FIG. 1 shows—in schematic depiction—a side view of a rail vehicle 100. The rail vehicle includes an underside, wherein a direction of travel is defined in the operation of the rail vehicle.

Figure 4A:
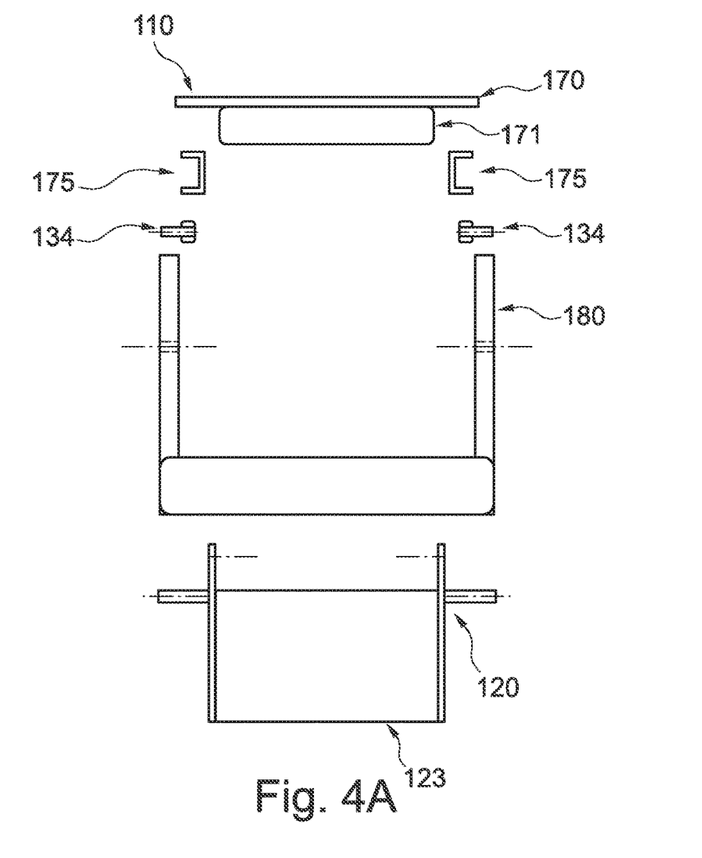
FIG. 4A shows an exploded view of the airbag module in the open state according to one embodiment.
Figure 4B:
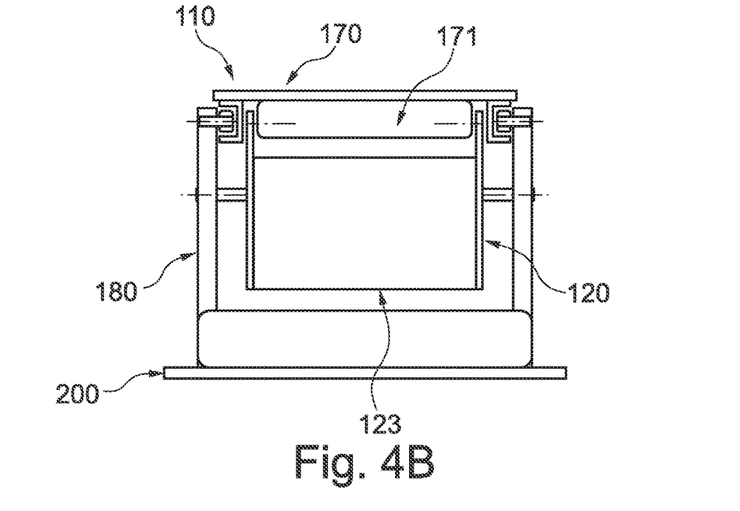
FIG. 4B shows a front view of the airbag module in the open state according to one embodiment.
Figure 4C:
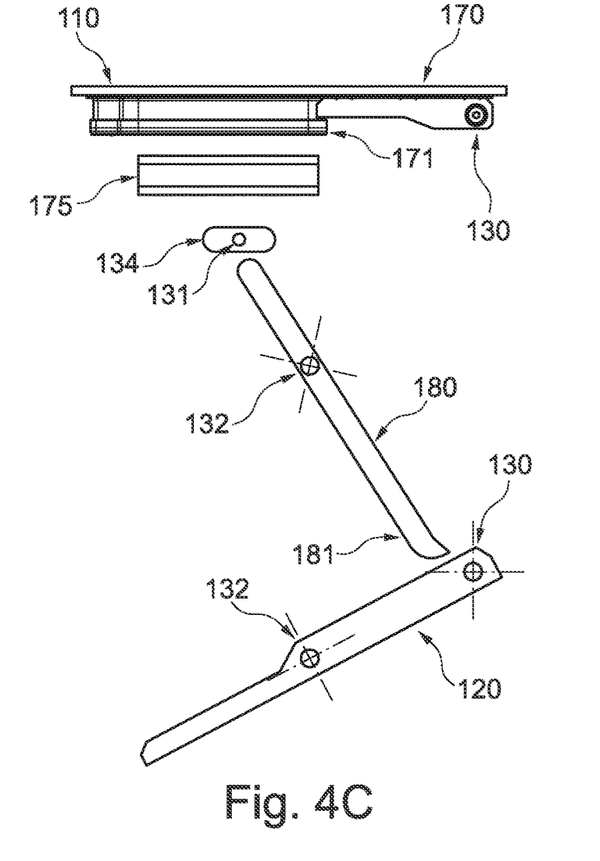
FIG. 4C shows an exploded view of the airbag module in the open state according to one embodiment.
Figure 4D:
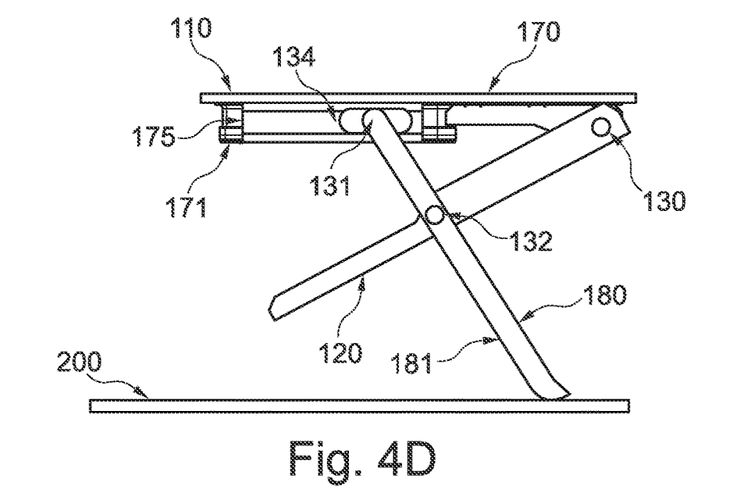
FIG. 4D shows a side view of the airbag module in the open state according to one embodiment.

FIG. 4 illustrates a part of an airbag module 110 according to one embodiment, wherein FIGS. 4A and 4B depict a front view, and FIGS. 4C and 4D depict a side view, wherein FIGS. 4A and 4C correspond to exploded views. The airbag module 110 is configured to be fixed on the underside of the rail vehicle 100, between the rail vehicle 100 and the track 200.

The airbag module 110 includes a bracket 170 for fixing the airbag module 110 on the underside of the rail vehicle. Furthermore, the airbag module 110 includes a support flap 120 with a front end and a rear end. The support flap 120 may be pivotably mounted at the rear end by means of a first pivot bearing 130. The support flap 120 may thereby be pivotably mounted at its rear end on the bracket 170 by means of the first pivot bearing 130. For example, the support flap 120 may be pivotably mounted on the bracket 170 by means of two first pivot bearings 130.

Figures 3A, 3B:
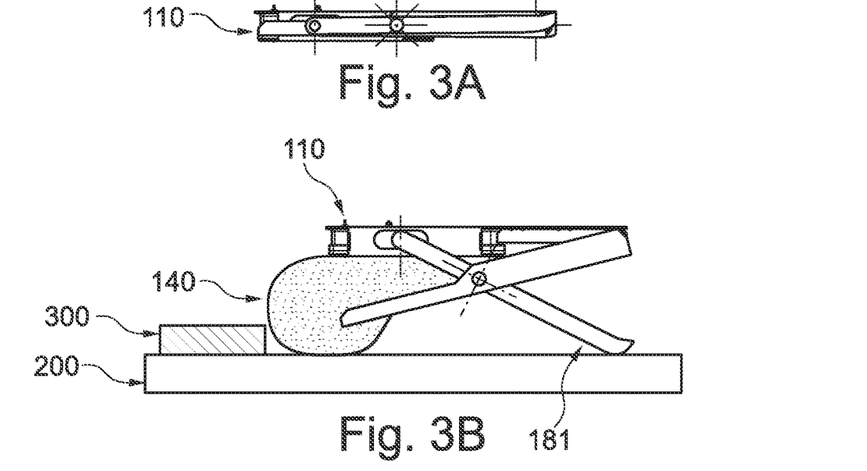
FIG. 3A shows a side view of the airbag module in the closed state according to one embodiment.
FIGS. 3B, 3C, and 3D show a side view of the airbag module in the open state according to one embodiment.

The airbag module includes a closed state, as shown for example in FIG. 3A, and an open state, as shown for example in FIG. 3B or 4. By pivoting the support flap 120, the airbag module 110 may be converted from a closed state into an open state. By pivoting the support flap 120, the front end of the support flap 120 may move toward the track 200.

The airbag module 110 includes a guide element 180 with a front end and a rear end. The guide element 180 may be pivotably mounted at the front end by means of a second pivot bearing 131. The guide element 180 may thereby be pivotably mounted at its front end on the bracket 170 by means of a second pivot bearing 131. For example, the guide element 180 may thereby be pivotably mounted on the bracket 170 by means of two second pivot bearings 131. In the open state of the airbag module 110, the rear end of the guide element 180 may be pivoted toward the track 200.

Furthermore, the airbag module 110 may include a third pivot bearing 132. The third pivot bearing 132 may movably connect the support flap 120 and the guide element 180 to each other. The third pivot bearing 132 may thereby be arranged in each case approximately in the middle of the support flap 120 and the guide element 180. The geometric structure made from the guide element and the support flap appears, when viewed from the side, approximately like the letter "X" or the arms of a scissors, as is visible, for example, in FIG. 4D. The third pivot bearing 132 may have the effect that the movements of the guide element 180 and the support flap 120 are mechanically coupled. In particular, the guide element 180 is configured to guide the movement of the support flap 120. For example, the support flap 120 may be movably connected to the guide element 180 by means of two third pivot bearings 132.

Figure 8A:
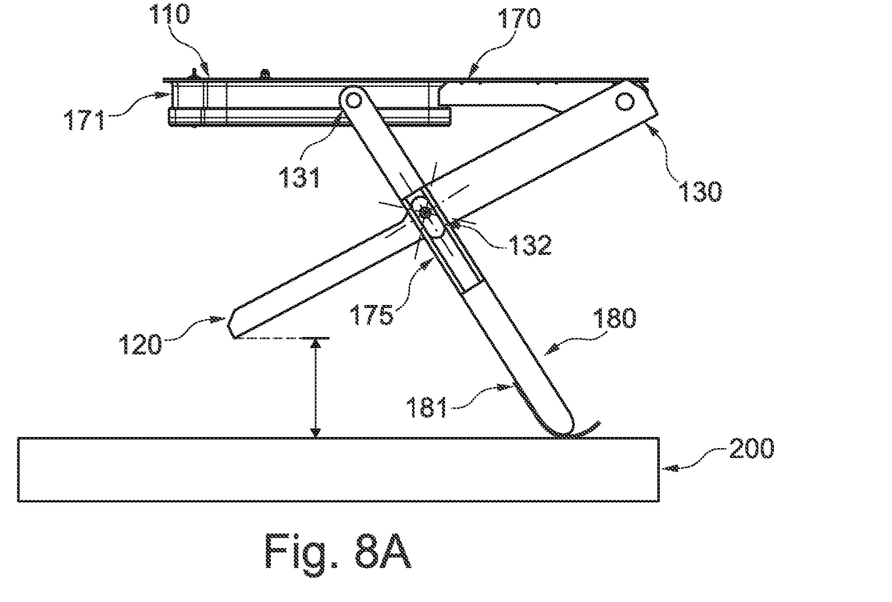
FIG. 8A shows a side view of the airbag module in the open state according to one embodiment.
Figure 8B:
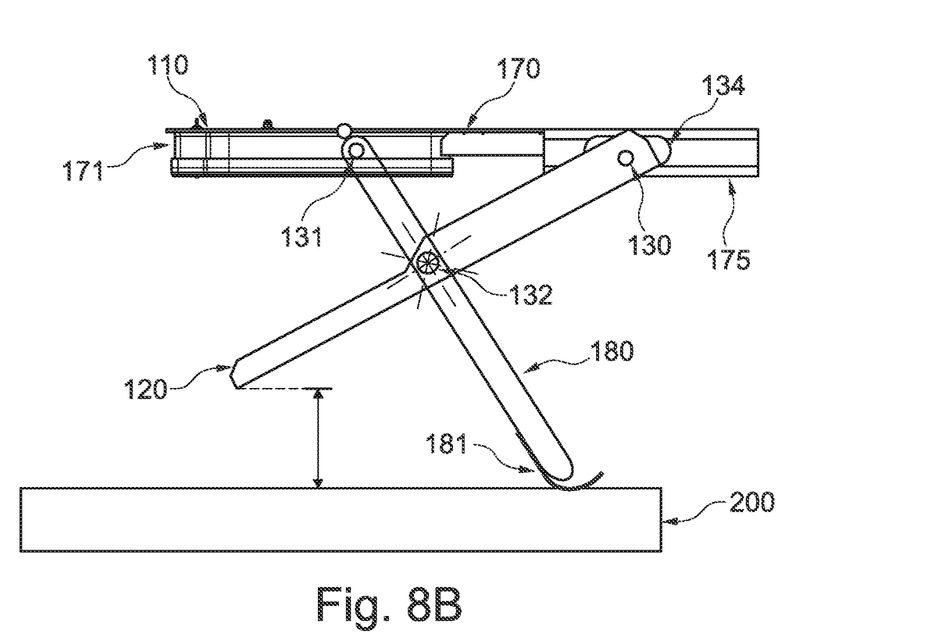
FIG. 8B shows a side view of the airbag module in the open state according to another embodiment.

The distance between the third pivot bearing 132 and the first pivot bearing 130 may be longer than the distance between the third pivot bearing 132 and the second pivot bearing 131, as is visible, for example, in FIG. 4D or 8A and 8B. By this means, an opening angle β between the guide element 180 and the bracket 170 may be greater than an opening angle α between the bracket 170 and the support flap 120 in the open state of the airbag module 110.

Furthermore, the airbag module 110 includes an airbag 140. The airbag 140 is not depicted in FIG. 4 to avoid cluttering the figure. For example, FIGS. 3B, 3C, 3D, and 2 each show embodiments of the airbag 140. The airbag 140 is fixed on the airbag module 110. In particular, the airbag 140 may be fixed on the support flap 120 and/or on the bracket 170. The bracket 170 of the airbag module 110 may include a first attachment 172. The airbag 140 may be fixed on the bracket 170 by means of the first attachment 172. The support flap 120 of the airbag module 110 may include a second attachment 124. The airbag 140 may be fixed on the support flap 120 by means of the second attachment 124.

In the closed state of the airbag module 110, the airbag 140 may be folded (not shown). In the open state of the airbag module 110, the airbag 140 may be unfolded. For example, the airbag 140 is filled in the open state of the airbag module 110. This is depicted by way of example in FIG. 3B or 3C. The airbag 140 may also not be filled in the open state of the airbag module 110, but instead be partially or completely flaccid. The airbag 140 may be partially or completely flaccid, in particular due to damage to the airbag 140 caused by a sharp object on the track 200. FIG. 3D illustrates a partially or completely flaccid airbag 140.

In its unfolded state, the airbag 140 may project beyond the front end of the support flap 120, so that the unfolded airbag 140 and the support flap 120 together form an impact protection for a person on the track 200.

In one embodiment, the airbag 140 includes an outer shell. The outer shell may be produced from a plastic material. The outer shell functions to protect the airbag 140 from damage due to obstacles, in particular due to friction with obstacles 300. The outer shell may partially or completely enclose the airbag 140.

A pivot bearing 130, 131, 132, selected from the group consisting of the first pivot bearing 130, the second pivot bearing 131, and the third pivot bearing, 132 is a displaceable pivot bearing.

According to one embodiment, the second pivot bearing 131 is the displaceable pivot bearing, as depicted by way of example in FIG. 4 or FIG. 3. In another embodiment, the first pivot bearing 130 is the displaceable pivot bearing, as depicted in FIG. 8B. In the case that the first pivot bearing 130 is the displaceable pivot bearing or the second pivot bearing 131 is the displaceable pivot bearing, the bracket 170 may include a guide rail 175 for displacing the first or the second pivot bearing 130, 131. The guide rail 175 is depicted, e.g., in FIGS. 4C, 5A, 6A, or FIG. 8B. For example, the bracket 170 may include two guide rails 175 for displacing the first or the second pivot bearing 130, 131 (see FIG. 4A).

Figure 6A:
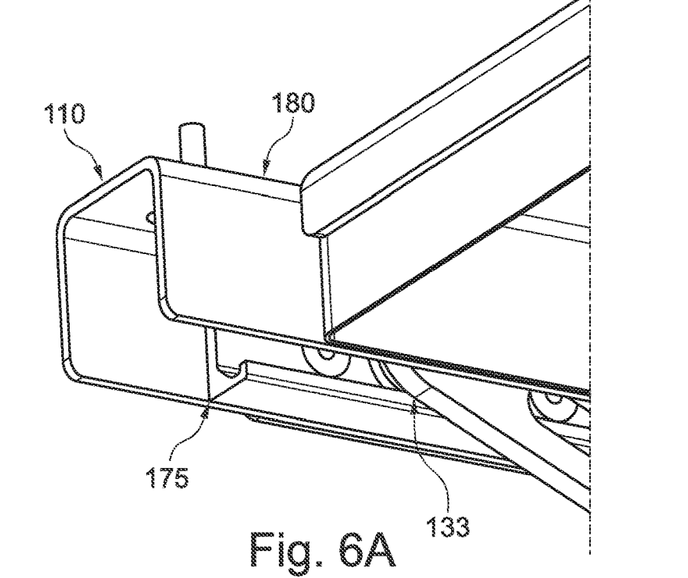
FIGS. 6A and 6B show a part of the airbag module according to one embodiment.
Figure 6B:
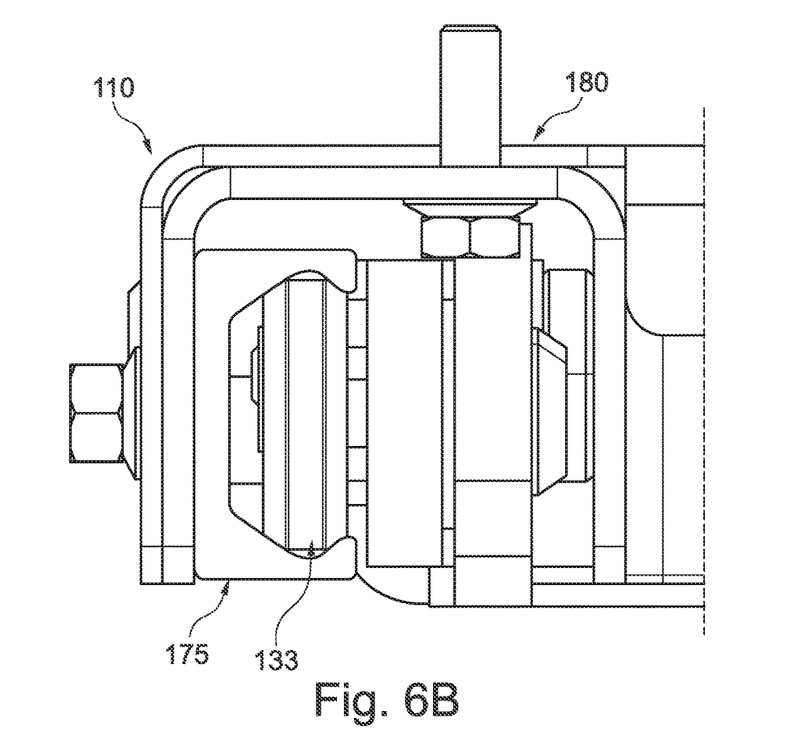

The first pivot bearing 130 or the second pivot bearing 131 may be fixed on a roller 133 or a sliding pad 134, whereby a displacement of the pivot bearing is facilitated. An embodiment of the roller 133 is depicted in FIG. 6B. An embodiment of the sliding pad is depicted in FIG. 4C. The roller 133 or the sliding pad 134 may thereby be arranged within the guide rail 175. The sliding pad 134 may thereby be produced from Teflon.

According to another embodiment, the third pivot bearing 132 is the displaceable pivot bearing. In this case, either the support flap 120 (not shown) or, as depicted in FIG. 8A, the guide element 180 may include a guide rail 175 for displacing the third pivot bearing 132. For example, the support flap 120 or the guide element 180 may include two guide rails 175 for displacing the third pivot bearing 132. The third pivot bearing 132 may be fixed on a roller 133 or a sliding pad 134, by which means a displacement of the third pivot bearing 132 is facilitated. The roller 133 or the sliding pad 134 may thereby be arranged within the guide rail.

According to one embodiment, the airbag module 110 may contact the track 200 in the open state. In the open state of the airbag module 110, the rear end of guide element 180 is hereby located vertically lower than the front end of the support flap 120. The vertical distance between the front end of the support flap 120 and the rear end of the guide element 180 is illustrated in FIGS. 8A and 8B. The support flap 120 preferably does not thereby contact the track 200.

According to one embodiment, the guide element 180 may directly or indirectly contact the track 200 in the open state of the airbag module 110. The guide element 180 may thereby hold the front end of the support flap 120 at a distance from the track 200. The guide element 180 may include a rounded section 181 (see, for example, FIG. 4D) or a beveled section 182 (see, for example, FIG. 5B) at the rear end. The rounded section 181 or the beveled section 182 may include elastic properties, primarily in the vertical direction. The shape of the rounded section 181 and the beveled section 182 leads to the effect that the rear end of the guide element 180 may easily slide over the obstacle 300, wherein an elastic configuration of the rounded section 181 or the beveled section 182 promotes this sliding even more.

Figure 5A:
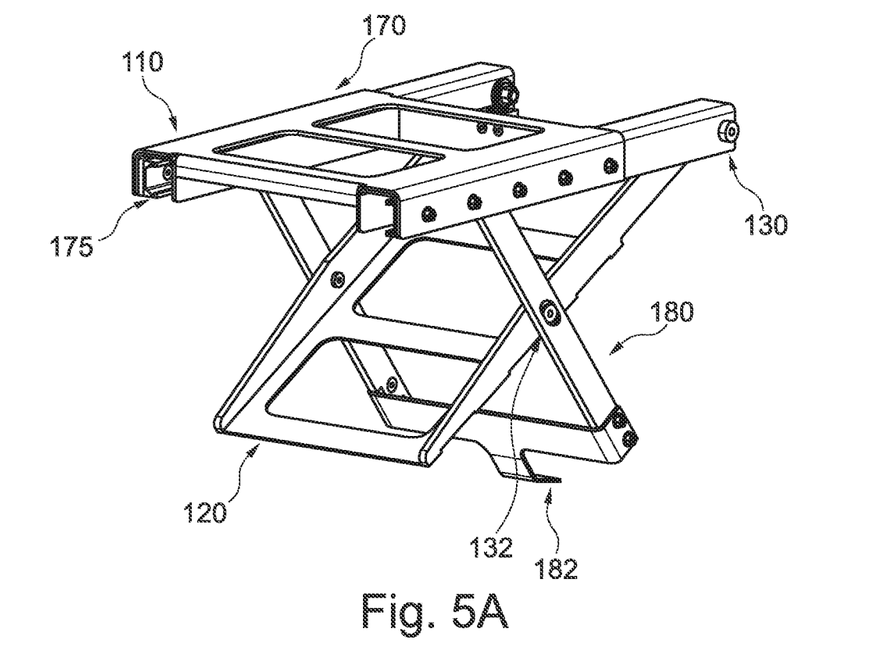
FIGS. 5A and 5B show side views of the airbag module in the open state according to one embodiment.
Figure 5B:
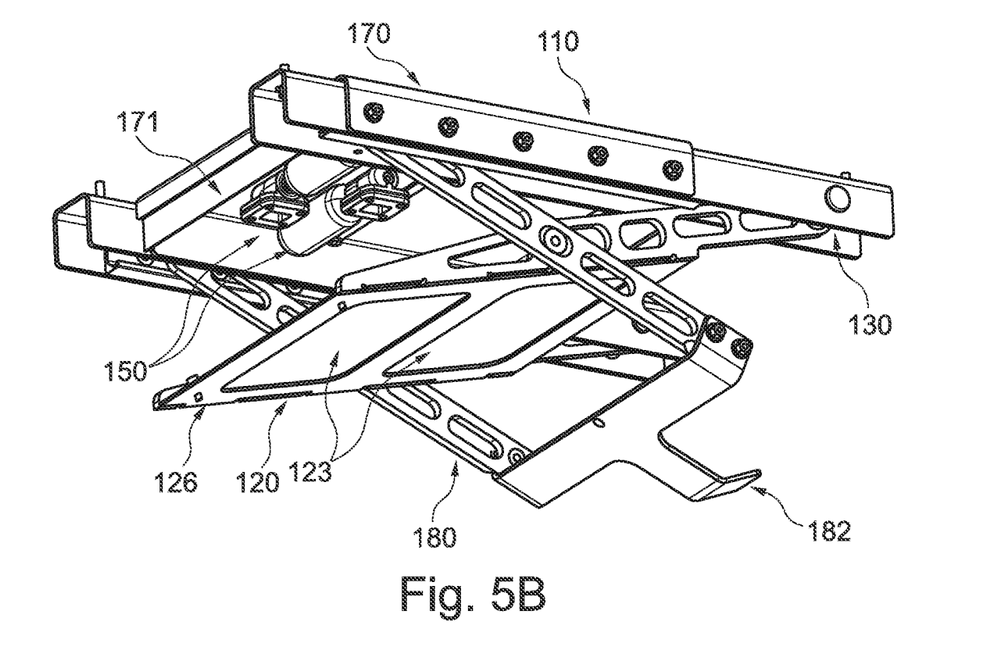

According to one embodiment, the bracket 170 may include a storage unit 171 open toward the support flap 120. Some embodiments of the storage unit 171 are depicted in FIGS. 4 and 5B. In the closed state of the airbag module 110, the storage unit 171 may be closed by the support flap 120 and form a receptacle. The airbag 140 may be inserted into the receptacle. Furthermore, the storage unit 171 may include a seal. The seal functions to increase the protection of the folded airbag. The storage unit 171 may be a section of the bracket 170, and thus form an integral unit; the storage unit 171 may, also be a separate feature, wherein in this case, the storage unit 171 is fixed on the bracket 170, for example, is screwed to the bracket.

According to one embodiment, the support flap 120 may include a frame 126, at the rear end of which the first pivot bearing 130 is arranged. The support flap 120 may include a cover plate 123, which may be supported by the frame 126. Embodiments of the frame 126 and the cover plate 123 are shown, for example, in FIGS. 4A, 4B, and 5B. The cover plate 123 advantageously functions for protecting the folded airbag 140 from environmental factors in the closed state of the airbag module 110. Alternatively, the support flap 120 may also include a compound structure made from the cover plates 123. The cover plate 123 may be a section of the support flap 120 and thus form an integral unit; the cover plate 123 may, also be a separate feature, wherein in this case, the cover plate 123 is fixed on the support flap 120, for example, is screwed to the support flap 120. The cover plate 123 may be produced from a lightweight material, for example, from a plastic material or from a composite material.

In one embodiment, the airbag module 110 includes a gas pressure device 150 for sudden filling of the airbag during opening of the airbag module. The gas pressure device 150 may be connected to the bracket 170. The gas pressure device 150 may include at least one gas cylinder. FIG. 5B illustrates a part of the gas pressure device 150, wherein the embodiment of the gas pressure device 150 depicted in FIG. 5B includes two gas cylinders. Furthermore, the gas pressure device 150 may include at least one pressure reducer which may be connected to the gas cylinder. The pressure reducer may additionally be connected to the airbag 140. The gas pressure device 150 may include at least one valve, wherein the valve may be arranged between the gas cylinder and the pressure reducer or between the pressure reducer and the airbag. In the closed state of the airbag module 110, the valve may be closed. Upon opening the airbag module 110, the valve may be opened, by which means the airbag 140 may be suddenly filled. Alternatively, the gas cylinder may include a valve, which may be closed in the closed state of the airbag module 110, while during opening of the airbag module 110, the valve may be opened, by which means the airbag 140 may be suddenly filled.

Figure 7:
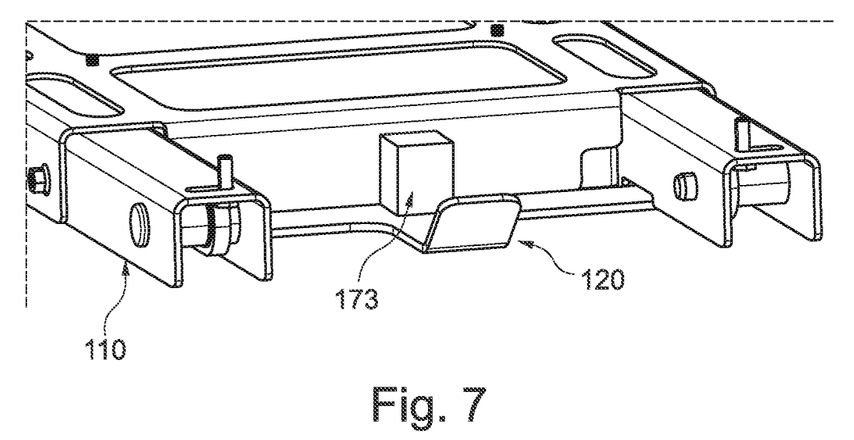
FIG. 7 shows a part of the airbag module according to one embodiment.

According to another embodiment, the guide element 180 is fixed in the area of its rear end via a releasable locking means 173 in the closed state of the airbag module 110. One embodiment of the locking means 173 is depicted in FIG. 7. The locking means 173 may be releasable for releasing the guide element 180 and for converting the airbag module 110 into the open state. By releasing the guide element 180, the support flap 120 may likewise be released.

According to one embodiment, the support flap 120 is fixed in the area of its front end via a releasable locking means 173 in the closed state of the airbag module 110. This embodiment is not shown in the figures; the releasable locking means 173 may be configured as is depicted in FIG. 7. The locking means 173 may be releasable for releasing the support flap 120 and to convert the airbag module 110 into the open state. By releasing the support flap 120, the guide element 180 may likewise be released.

According to one embodiment, the locking means 173 may be configured to trigger the sudden filling of the airbag 140 by the gas pressure device 150. According to one embodiment, the locking means 173 may be configured to open the at least one valve of the gas pressure device 150. The releasable locking means 173 may include an element that is fixed on the bracket 170 and which fixes the support flap 120 or the guide element 180 in the closed state. Furthermore, the locking means 173 may include a quick lock release mechanism, which may quickly release a mechanical connection between the bracket 170 and the support flap 120 or the guide element 180, wherein the support flap 120 and/or the guide element 180 may be released. In one embodiment, the locking means 173 may include an electromagnetic magnetic locking means, wherein an electromagnet may be fixed on the bracket 170 and a passive magnet on the support flap 120 or the guide element 180. In another embodiment, the locking means 173 may include a cutting device, wherein the cutting device may include a mechanical connection between the bracket 170 and the support flap 120 or the guide element 180 and a cutting element. The cutting element may be quickly moved towards the mechanical connection, wherein the mechanical connection may be severed. In another embodiment, the locking means 173 may include an electromechanical locking means, wherein the support flap 120 or the guide element 180 may include a hook and the bracket 170 may include an electromechanically movable latch.

When the support flap 120 and/or the guide element 180 has been released by the locking means 173, then the airbag module 110 may be converted into the open state due to the dead weight of the support flap 120 and the guide element 180. For example, the airbag module 110 may additionally include a spring device 160. The spring device 160 may be tensioned in the closed state of the airbag module, and after release of said spring device, the support flap 120 and the guide element 180 pivot suddenly to open the airbag module 110. The spring device 160 may, in particular when the spring device 160 is not tensioned or is not elastically deformed, have a U-shape. The spring device 160 may be elastically deformable. In particular, the spring device 160 may be elastically deformed when the airbag module 110 is located in the closed state. Due to the presence of the spring device 160, the time duration required to convert from the closed state into the open state may advantageously be substantially reduced.

FIG. 3A shows a side view of one embodiment of the airbag module 110 in the closed state. Since both the support flap 120 and also the guide element 180 are pivotably mounted, a compact design is facilitated for the airbag module.

Figure 3C:
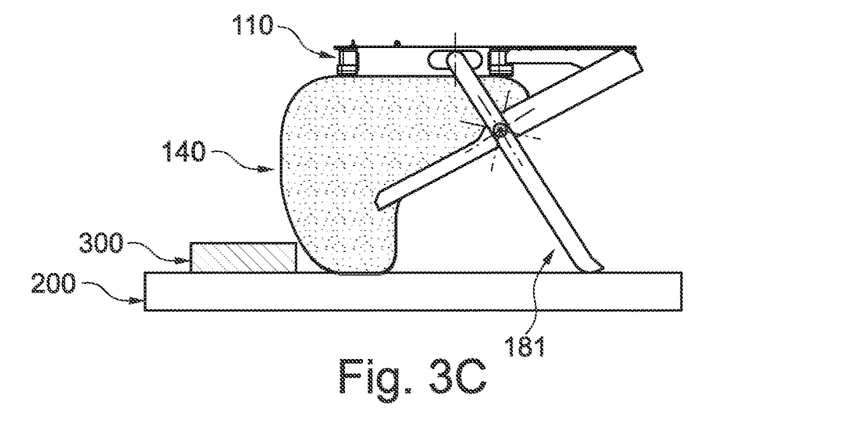
Figure 3D:
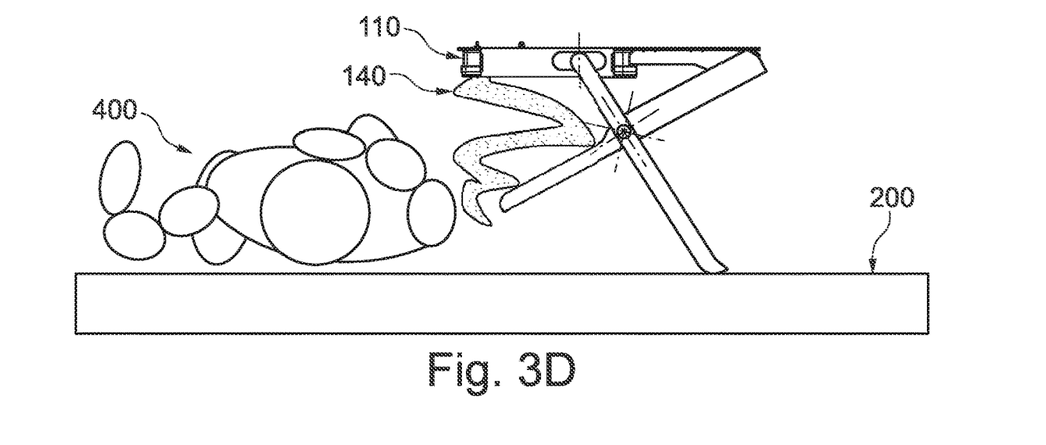

FIGS. 3B and 3C show a side view of the airbag module 110 in the open state according to one embodiment. FIG. 3B thereby shows the airbag module 110 with a small distance between the underside of the rail vehicle 100 and the track 200, while FIG. 3C shows the airbag module 110 with a larger distance between the underside of the rail vehicle 100 and the track 200. For reasons of overview, only a few of the features of the airbag module 110 are shown. The airbag module 110 is thus configured to adapt opening angle α between the bracket 170 and the support flap 120 and opening angle β between the bracket 170 and the guide element 180 at different distances between the underside of the rail vehicle 100 and the track 200. In other words, the airbag module is configured to adapt a height of the airbag module 110 in the open state.

As is illustrated in FIGS. 3B and 3C, the airbag 140 of the airbag module 110 unfolds sufficiently both at larger and also smaller distances between the underside of the rail vehicle 100 and the track 200. Furthermore, the airbag module 110 is configured to prevent a "slipping through" of a person, both at larger and also at smaller distances between the underside of the rail vehicle 100 and the track 200.

FIG. 3D shows a side view of the airbag module 110 in the open state including a partially or completely flaccid airbag 140. Due to the attachment of the airbag 140 on the airbag module 110, in particular on the bracket 170 and on the support flap 120, the airbag 140 may not "slip out" of a collision area with a person, by which means the partially or completely flaccid airbag 140 offers protection for a person involved in an accident.

Obstacles 300 on the track are additionally depicted in FIGS. 3B and 3C, wherein the track 200 may itself have elevations and unevenness, and thus a part of the track 200 may simultaneously be the obstacle 300. The guide element 180, in particular in the presence of a rounded section 181 or a beveled section 182 arranged at the rear end of the guide element, slides over the obstacle 300 by pivoting.

According to one embodiment, a rail vehicle 100 is provided with an airbag module 110 according to one of the preceding embodiments, wherein the airbag module 110 is fixed on the underside of the rail vehicle 100 between the rail vehicle 100 and the track 200.

Figure 2:
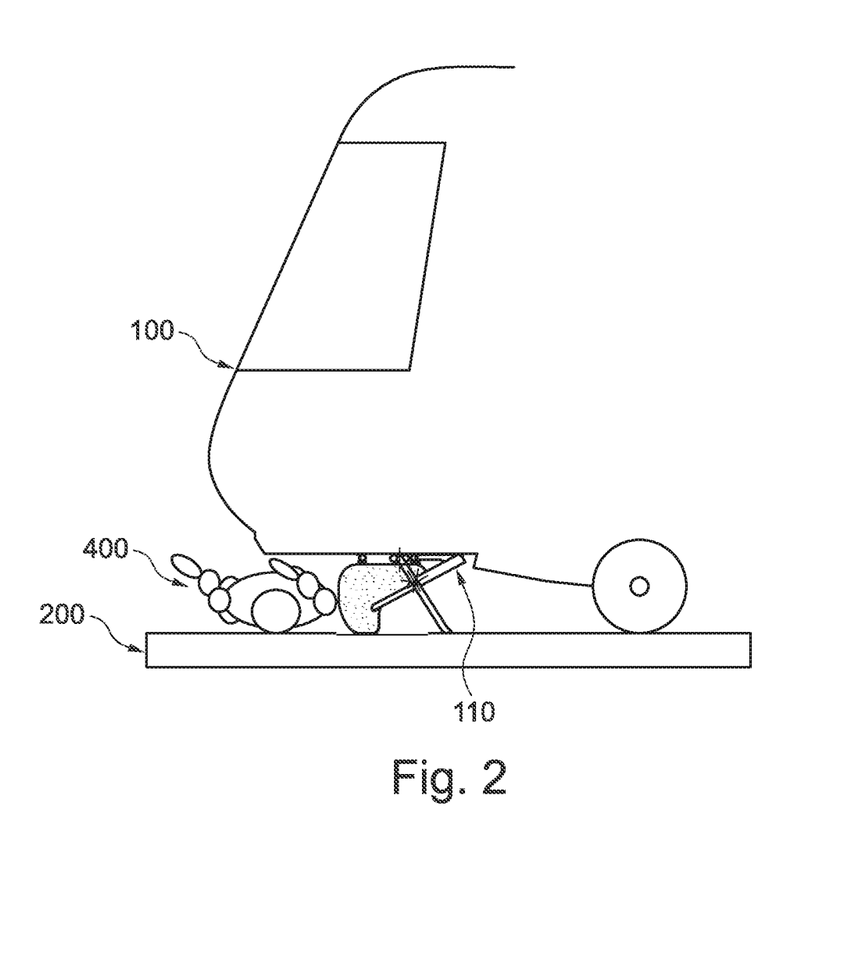
FIG. 2 illustrates the function of the rail vehicle according to one embodiment in the case of a collision of a person with the rail vehicle.

FIG. 2 shows a rail vehicle 100 with an airbag module 110. Due to the arrangement of the airbag module 110 on the underside, no "trampoline" effect occurs during an accident, which may lead to a person bouncing back due to the hard vehicle front and thus suffering additional injuries.

The rail vehicle 100 may include a plurality of airbag modules 110. Advantageously, each airbag module 110 may be fixed individually and independently from other airbag modules 110 on the rail vehicle 100.

The airbag module 110 may be fixed directly on the underside of the rail vehicle 100, for example, the airbag module 110 may be bolted to the underside of the rail vehicle 100. In another embodiment, a base plate is provided, which is fixed on the underside of the rail vehicle 100, for example, by screwing or welding. The airbag module 110 is thereby fixed on an underside of the base plate, for example, by screwing or welding. The base plate simplifies maintenance and/or an installation, conversion, or removal of the airbag module 110. In case of the presence of a plurality of airbag modules 110, one or a plurality of base plates may be provided. Each airbag module may thereby be respectively fixed to a base plate. Advantageously, a plurality of airbag modules may be fixed on one base plate, or all airbag modules may be fixed on one base plate.

In one embodiment, the rail vehicle 100 includes at least two of airbag modules 110, 111 described herein. When viewed in the direction of travel, the two airbag modules 110, 111 are laterally adjacent and, with respect to a center line of the rail vehicle, arranged on different sides of the rail vehicle. A first airbag module 110 may thereby be located at least partially on a left side of a left rail, and a second airbag module 111 may be located at least partially on a right side of a right rail.

Figure 9A:
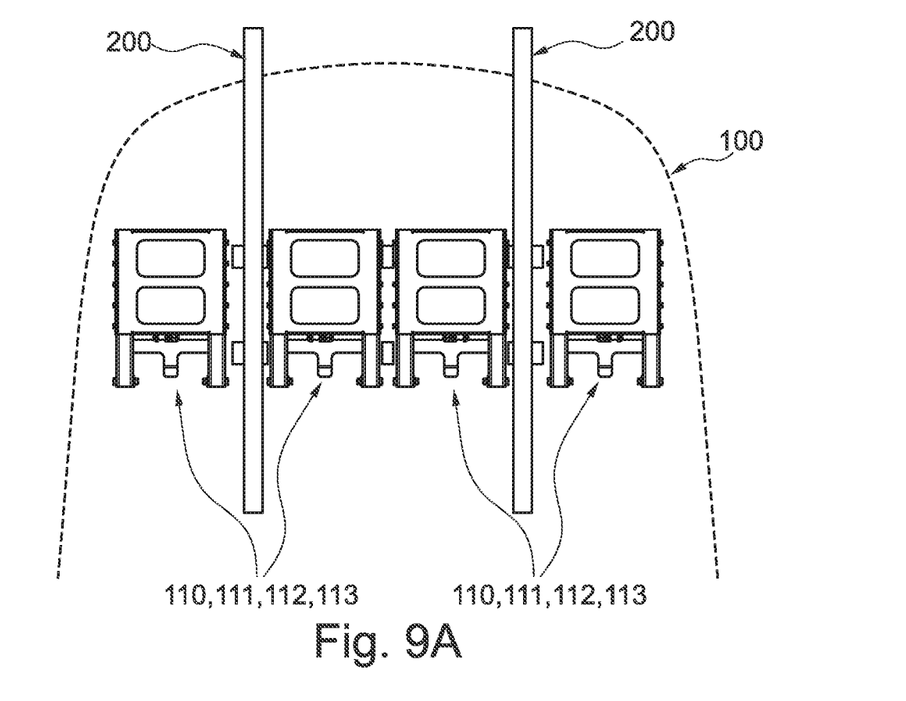
FIG. 9A shows a top view of a rail vehicle according to one embodiment including four airbag modules.
Figure 9B:
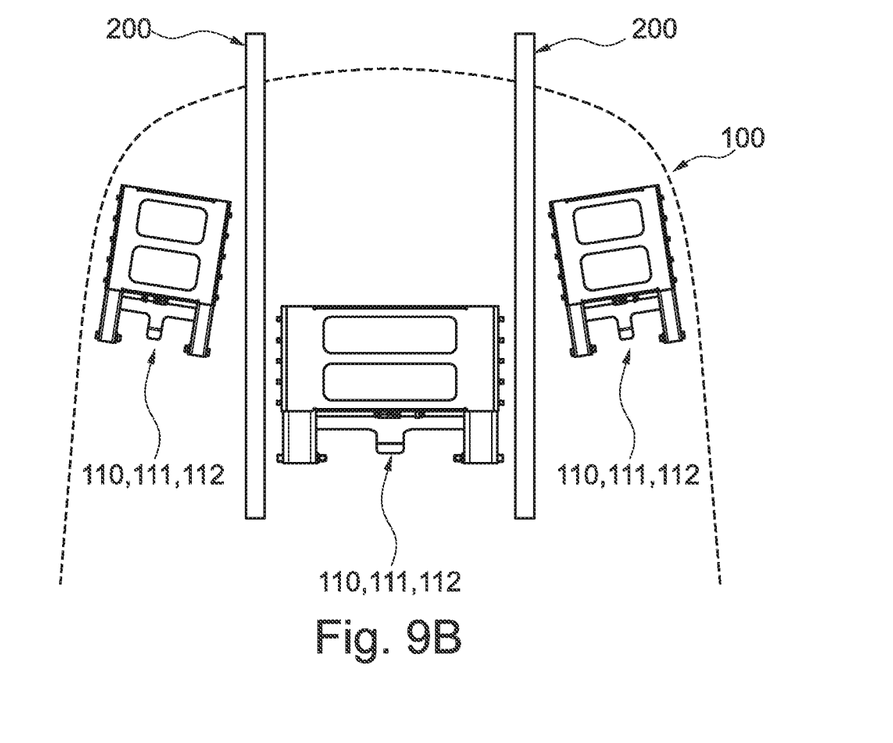
FIG. 9B shows a top view of a rail vehicle according to one embodiment including three airbag modules.

In another embodiment, the rail vehicle 100 includes at least three of airbag modules 110, 111, 112 described herein (see FIG. 9B). A first airbag module 110 is fixed on the rail vehicle 100 in such a way that it is located between the rails, when viewed in the direction of travel. A second airbag module 111 is fixed on the rail vehicle 100 in such a way that it is located on the left side of the left rail, when viewed in the direction of travel. Furthermore, a third airbag module 112 is fixed on the rail vehicle 100 in such a way that it is located on the right side of the right rail, when viewed in the direction of travel.

Furthermore, in another embodiment, the rail vehicle 100 includes at least four of airbag modules 110, 111, 112, 113 described herein (see FIG. 9A). A first airbag module 110 and a second airbag module 111 are fixed on the rail vehicle 100 in such a way that they are located between the rails, when viewed in the direction of travel. A third airbag module 112 is fixed on the rail vehicle 100 in such a way that it is located on the left side of the left rail, when viewed in the direction of travel. Furthermore, a fourth airbag module 113 is fixed on the rail vehicle 100 in such a way that it is located on the right side of the right rail, when viewed in the direction of travel.

The respective position of the airbag module on the underside of the rail vehicle may be freely selected. For example, in FIG. 9B, the first airbag module 110 is arranged behind the airbag modules 111, 112.

Furthermore, the orientation of the airbag module with respect to the underside of the rail vehicle is also freely selectable. For example, in FIG. 9B, all three airbag modules 110, 111, 112 are oriented differently with respect to the underside of the rail vehicle and are thus not arranged in parallel.

Even if specific embodiments are depicted and described herein, it remains within the scope of the present invention to suitably modify the embodiments shown without deviating from the scope of protection of the present invention.

The invention claimed is:

1. An airbag module for fixing on an underside of a rail vehicle between the rail vehicle and a track, the airbag module comprising:
   a bracket for fixing the airbag module on the underside of the rail vehicle;
   a support flap with a front end and a rear end, wherein the rear end of the support flap is pivotably mounted by a first pivot bearing, wherein the airbag module is convertible from a closed state into an open state by pivoting the support flap, and the front end of the support flap thereby being movable toward the track;
   a guide element with a front end and a rear end, wherein the front end of the guide element is pivotably mounted by a second pivot bearing and, in an open state of the airbag module, the rear end of the guide element is pivoted toward the track;
   a third pivot bearing, which moveably connects the support flap and the guide element to each other; and
   an airbag, fixed on at least one of the support flap and the bracket, the airbag being folded in the closed state of the airbag module and unfolded in the open state of the airbag module, and the airbag projecting past the front end of the support flap in the unfolded state so that the unfolded airbag and the support flap together form an impact protection for a person on the track,
   wherein a pivot bearing, selected from the group consisting of the first pivot bearing, the second pivot bearing, and the third pivot bearing, is a displaceable pivot bearing.

2. The airbag module according to claim 1, wherein, in the open state of the airbag module, the rear end of the guide element is located vertically lower than the front end of the support flap.

3. The airbag module according to claim 1, further comprising a gas pressure device for filling of the airbag during opening of the airbag module.

4. The airbag module according to claim 1, wherein, in the closed state of the airbag module, the guide element is fixed in an area of the rear end via a releasable locking means, and wherein the locking means is releasable to release the guide element and to convert the airbag module into the open state.

5. The airbag module according to claim 1, wherein, in the closed state of the airbag module, the support flap is fixed in an area of the front end via a releasable locking means, and wherein the locking means is releasable to release the support flap and to convert the airbag module into the open state.

6. The airbag module according to claim 1, further comprising a spring device which is tensioned in the closed state of the airbag module, and wherein, after the release of the spring device, the spring device pivots the support flap and the guide element to open the airbag module.

7. The airbag module according to claim 1, wherein the first pivot bearing pivotably connects the support flap and the bracket, wherein the second pivot bearing pivotably connects the guide element and the bracket, and wherein the second pivot bearing is the displaceable pivot bearing.

8. The airbag module according to claim 1, wherein the first pivot bearing pivotably connects the support flap and the bracket, wherein the second pivot bearing pivotably connects the guide element and the bracket, and wherein the first pivot bearing is the displaceable pivot bearing.

9. The airbag module according to claim 7, wherein the bracket comprises a guide rail for displacing the first pivot bearing.

10. The airbag module according to claim 9, wherein the first pivot bearing is fixed on a roller or a sliding pad, and wherein the roller or the sliding pad is arranged within the guide rail.

11. The airbag module according to claim 1, wherein the bracket comprises a storage unit open toward the support flap, which, in the closed state of the airbag module is closed by the support flap, and which forms a receptacle into which the airbag is inserted.

12. A rail vehicle comprising an airbag module according to claim 1, wherein the airbag module is fixed on an underside of the rail vehicle between the rail vehicle and the track.

13. The rail vehicle according to claim 12, wherein the airbag module is fixed on the rail vehicle such that, in the closed state, the airbag module does not project past at least one of a front end and sides of the rail vehicle.

14. The rail vehicle according to claim 12, wherein the rail vehicle comprises at least two airbag modules each according to claim 1, wherein the rail vehicle defines a direction of travel, wherein the two airbag modules are arranged laterally adjacent when viewed in the direction of travel and, wherein, with respect to a center line of the rail vehicle, the two airbag modules are arranged on different sides of the rail vehicle.

15. The rail vehicle according to claim 12, wherein the rail vehicle comprises at least three airbag modules each according to claim 1,
wherein a first airbag module is fixed on the rail vehicle such that the first airbag module is located between the rails, when viewed in a direction of travel, and
wherein a second airbag module is fixed on the rail vehicle such that the second module is located on the left side of the left rail, when viewed in the direction of travel, and
wherein a third airbag module is fixed on the rail vehicle such that the third module is located on the right side of the right rail, when viewed in the direction of travel.

16. The airbag module according to claim 8, wherein the bracket comprises a guide rail for displacing the second pivot bearing.

17. The airbag module according to claim 16, wherein the second pivot bearing is fixed on a roller or a sliding pad, and wherein the roller or the sliding pad is arranged within the guide rail.

* * * * *